United States Patent [19]
Rokutan

[11] Patent Number: 5,774,433
[45] Date of Patent: Jun. 30, 1998

[54] OPTICAL RECORDING/REPRODUCING APPARATUS USING THREE COUNT CONTROL SIGNALS FOR COUNTING A NUMBER OF TRACKS CROSSED BY A LIGHT BEAM

[75] Inventor: Takao Rokutan, Tokyo, Japan

[73] Assignee: Olympus Optical Co., Ltd., Tokyo, Japan

[21] Appl. No.: 615,775

[22] Filed: Mar. 14, 1996

[30] Foreign Application Priority Data

Mar. 22, 1995 [JP] Japan ................................ 7-062534

[51] Int. Cl.⁶ .................................................. G11B 7/085
[52] U.S. Cl. ........................ 369/44.28; 369/54; 235/456
[58] Field of Search ............................... 369/44.28, 54, 369/58; 235/454, 456

[56] References Cited

U.S. PATENT DOCUMENTS

| | | |
|---|---|---|
| 4,484,319 | 11/1984 | Koishi et al. . |
| 4,539,664 | 9/1985 | Deguchi et al. . |
| 5,072,434 | 12/1991 | Uchikoshi et al. ................... 369/44.28 |
| 5,325,346 | 6/1994 | Hasegawa et al. ................... 369/44.28 |
| 5,394,386 | 2/1995 | Park et al. ........................... 369/44.28 |
| 5,440,535 | 8/1995 | Takagi et al. ........................ 369/44.28 |
| 5,473,587 | 12/1995 | Hamaguchi et al. ................ 369/44.28 |
| 5,640,376 | 6/1997 | Morishima ........................... 369/44.28 |

*Primary Examiner*—W. R. Young
*Attorney, Agent, or Firm*—Frishauf, Holtz, Goodman, Langer & Chick

[57] ABSTRACT

An optical head irradiates a light beam on an optical recording medium having a plurality of tracks on which data is recorded and a plurality of guide tracks for separating the plurality of tracks, and receives a response light beam from the optical recording medium. A count control signal generation circuit performs predetermined calculation of an output from the optical head, thereby generating three binary count control signals having different phases, which represent the position of the light beam on the tracks and the guide tracks along a direction of the light beam crossing the tracks. A count pulse generation circuit generates a count pulse on the basis of a transition path for positioning the light beam, which is defined by the three count control signals from the count control signal generation circuit. A track count circuit counts the count pulse output from the count pulse generation circuit while recognizing the moving direction of the light beam.

6 Claims, 16 Drawing Sheets

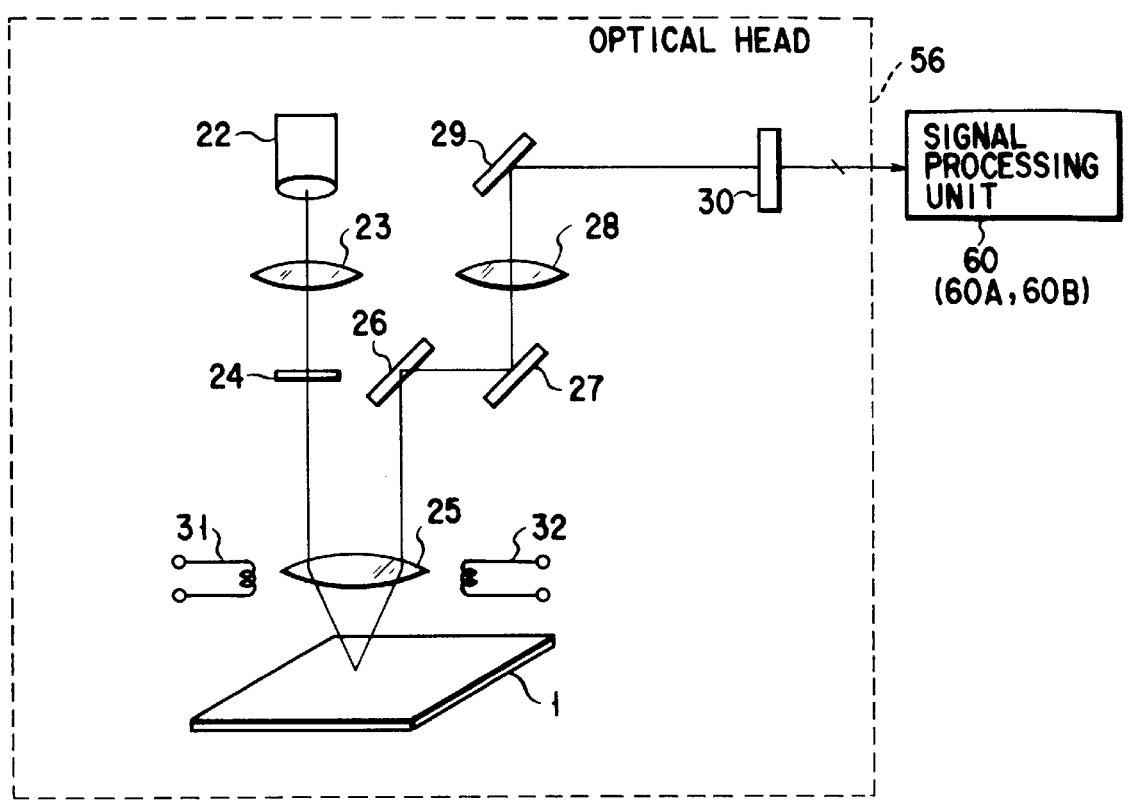
F I G. 3
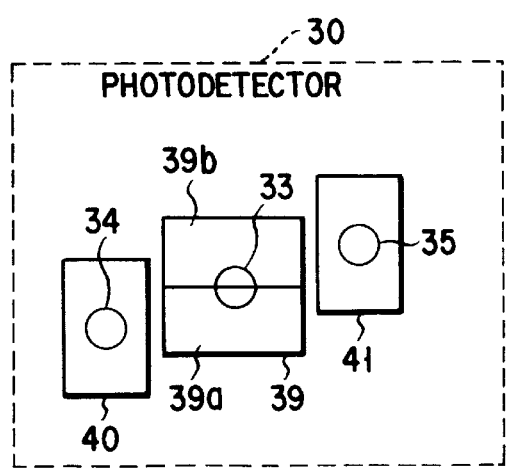
F I G. 4
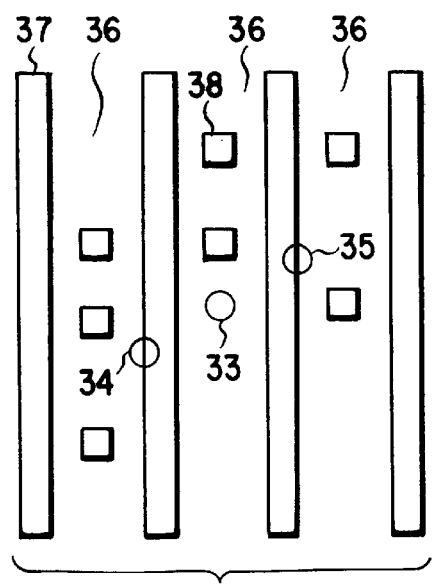
F I G. 5

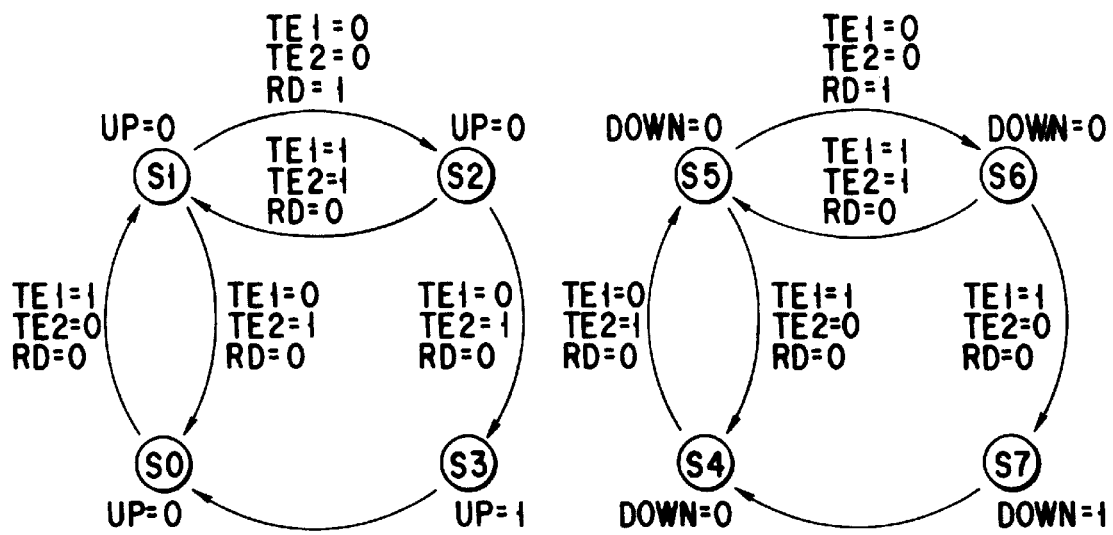
F I G. 7A    F I G. 7B
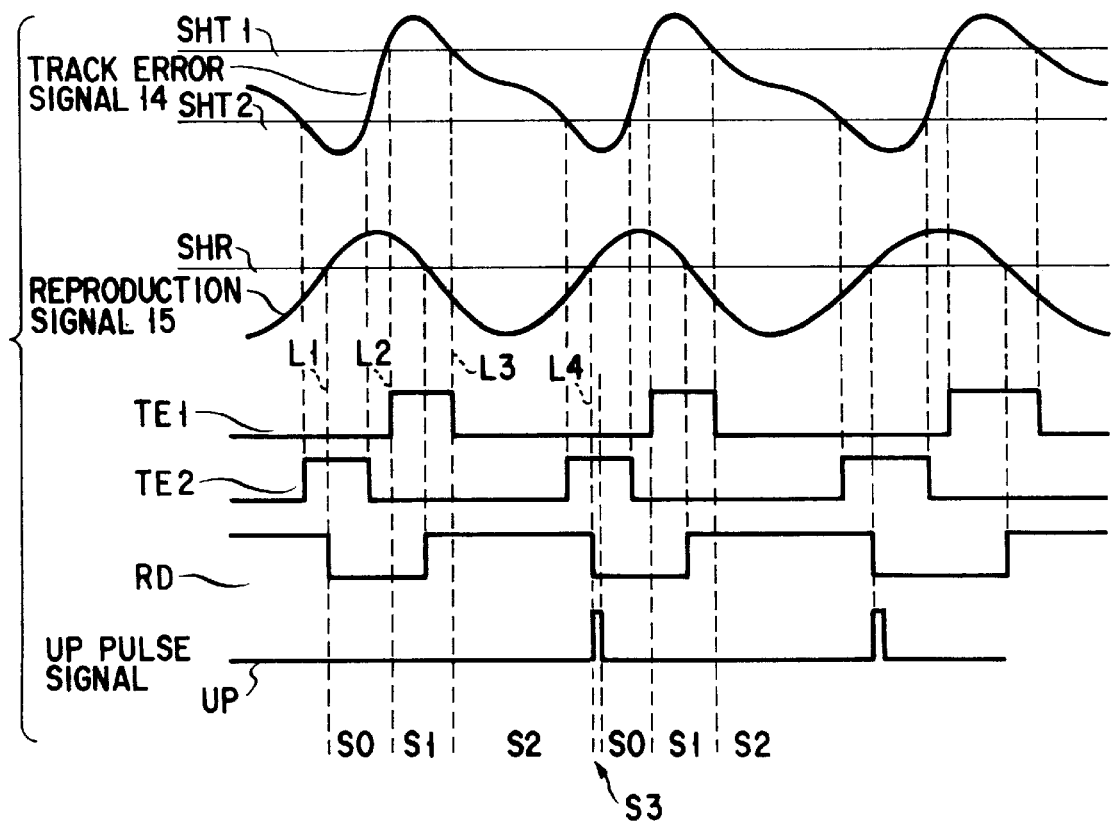
F I G. 8

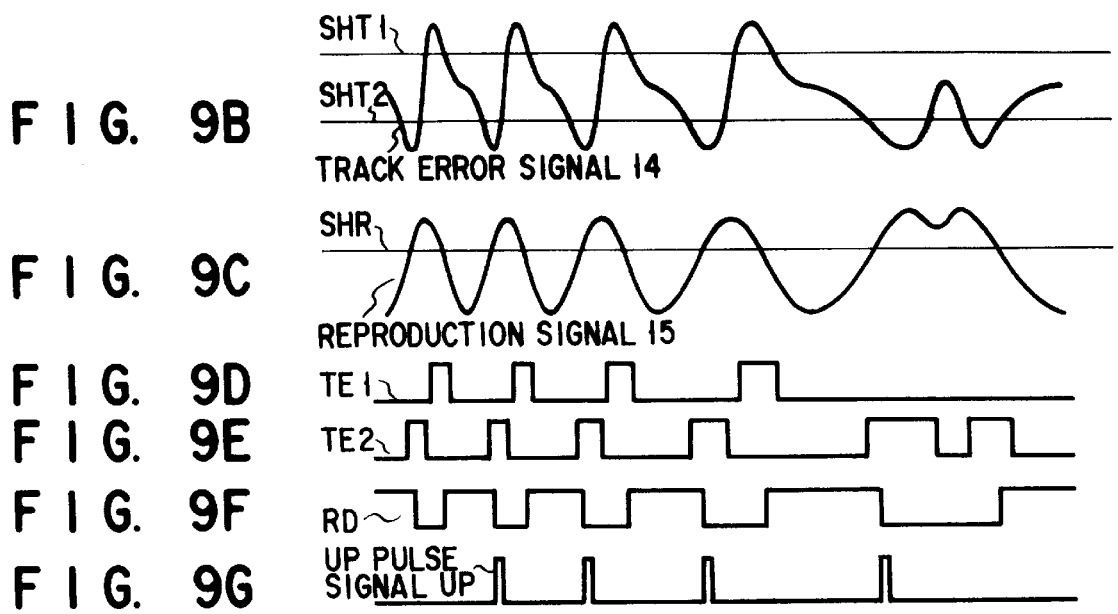
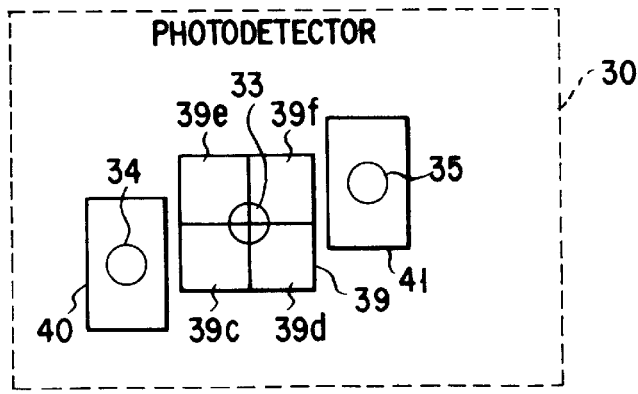
FIG. 10

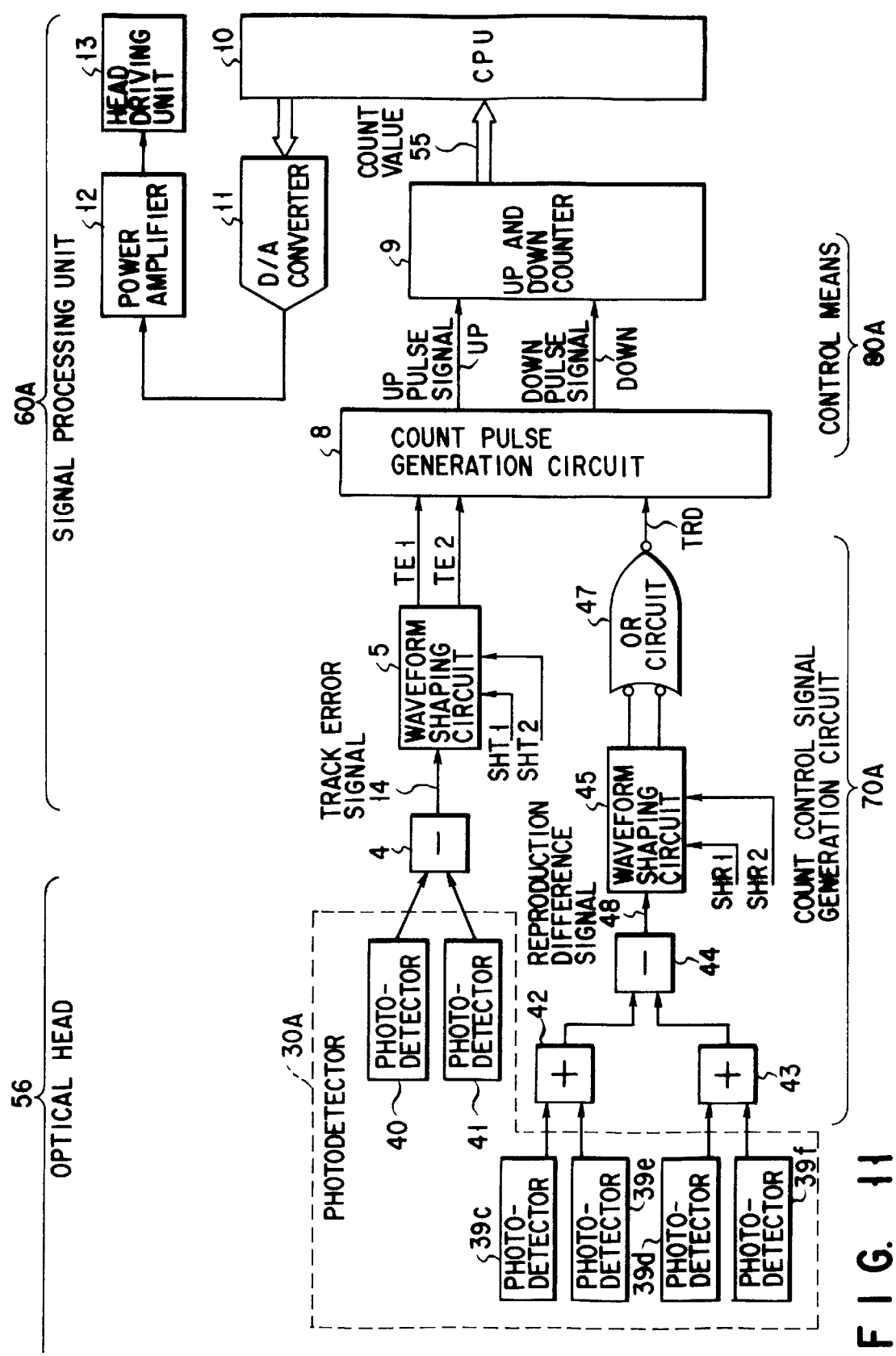
F I G. 11

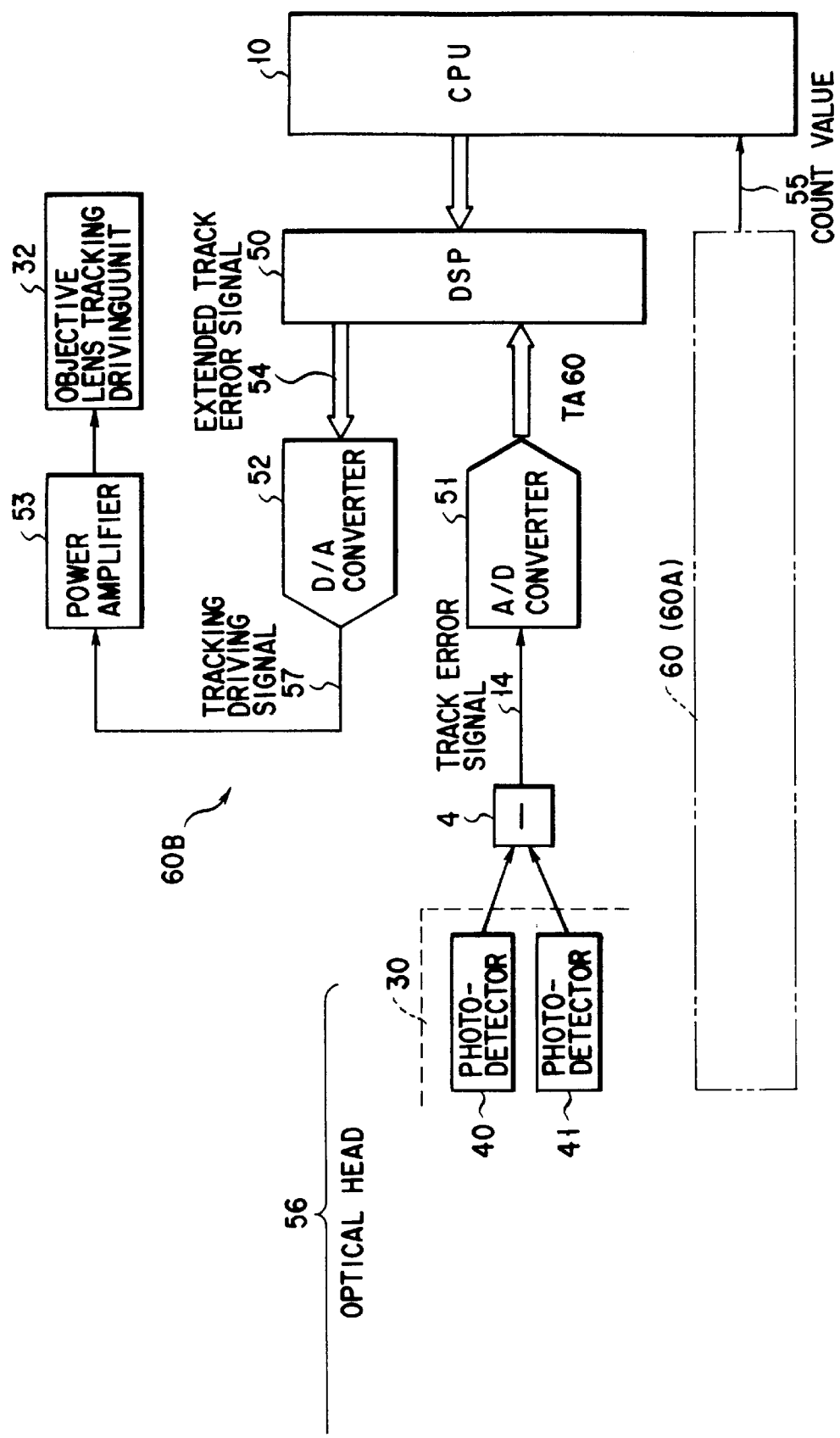
F I G. 13

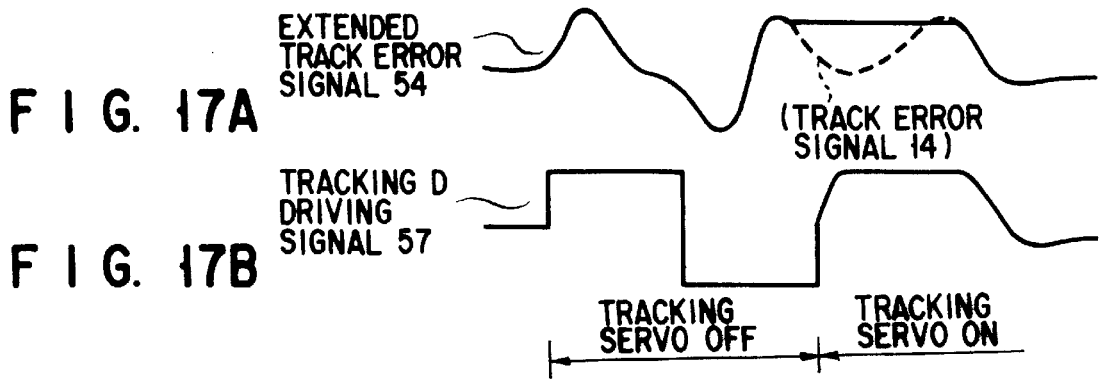
FIG. 17A
FIG. 17B
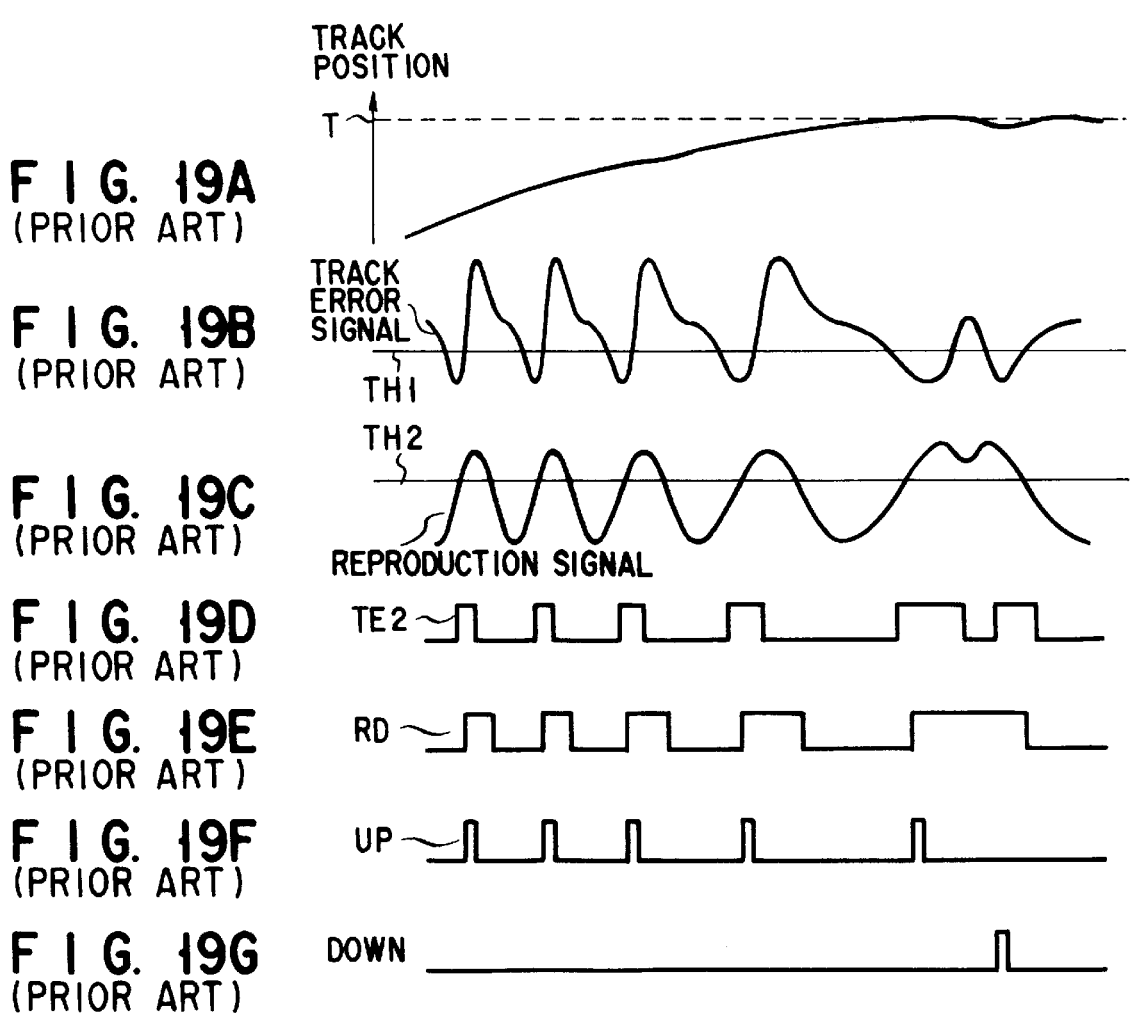
FIG. 19A (PRIOR ART)
FIG. 19B (PRIOR ART)
FIG. 19C (PRIOR ART)
FIG. 19D (PRIOR ART)
FIG. 19E (PRIOR ART)
FIG. 19F (PRIOR ART)
FIG. 19G (PRIOR ART)

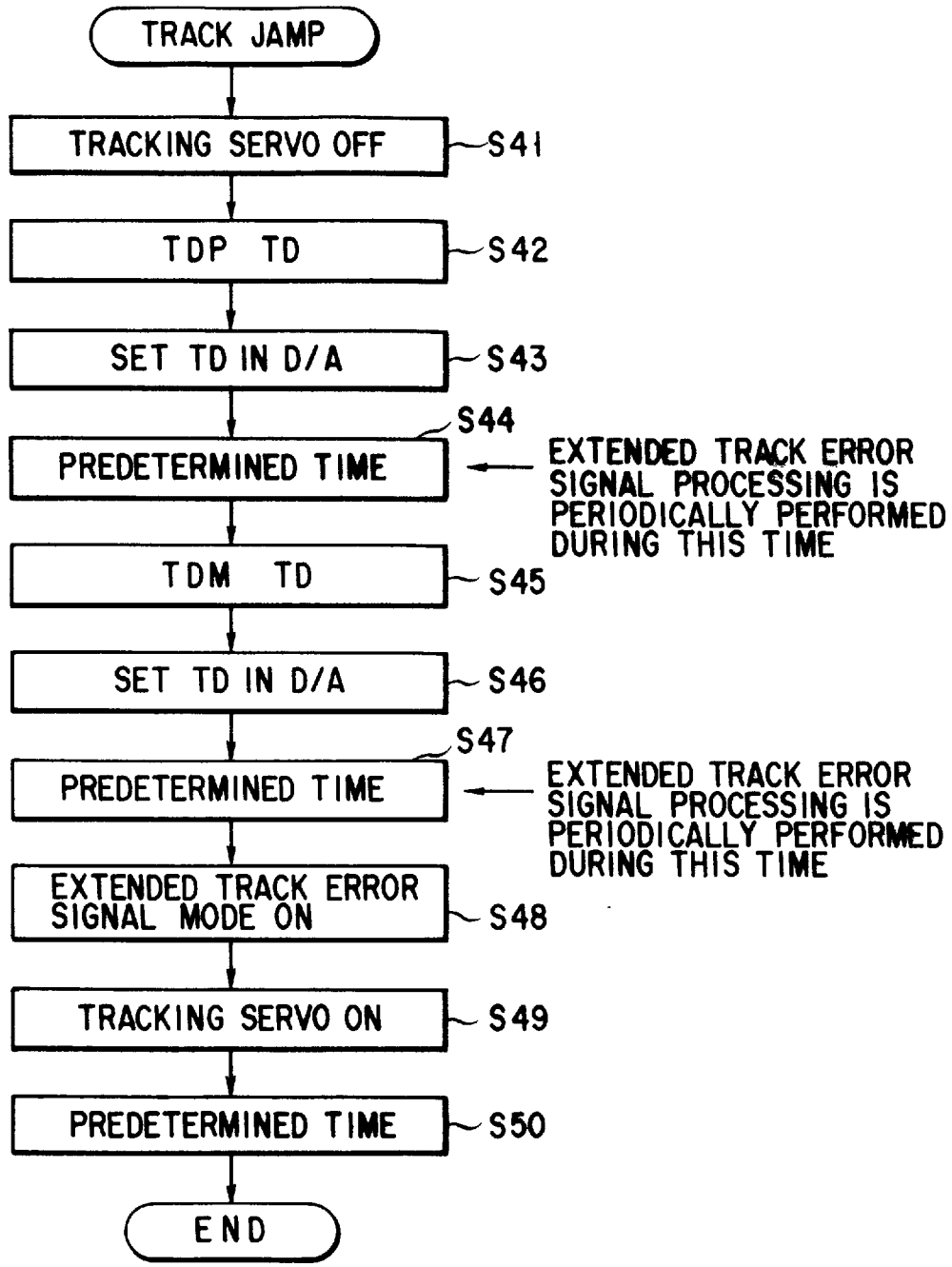
F I G. 18

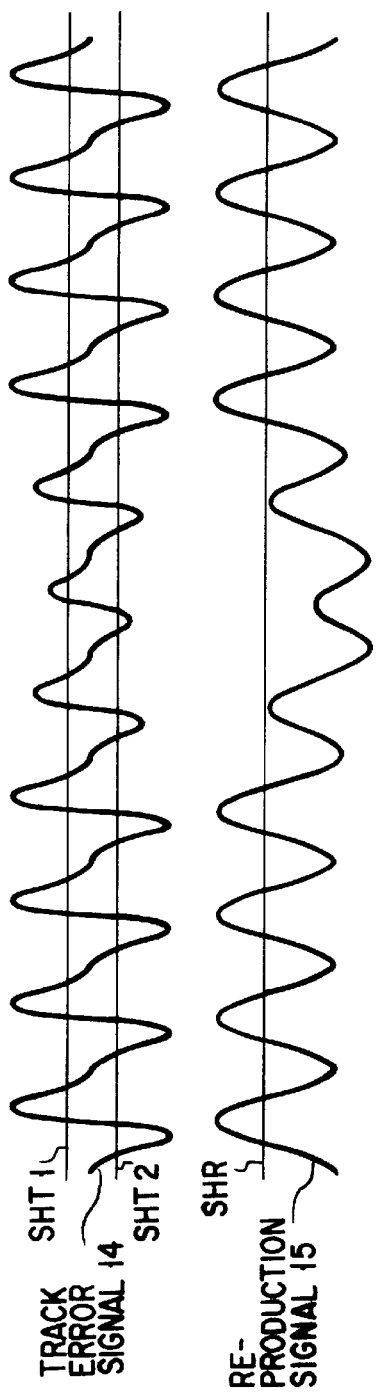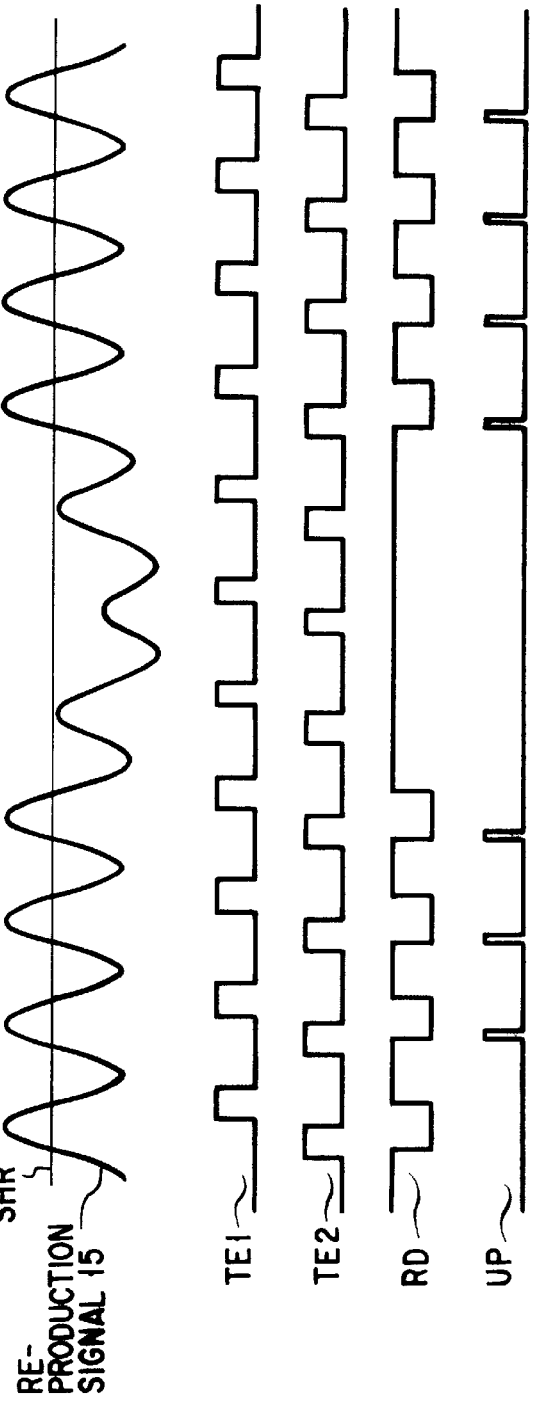

5,774,433

OPTICAL RECORDING/REPRODUCING APPARATUS USING THREE COUNT CONTROL SIGNALS FOR COUNTING A NUMBER OF TRACKS CROSSED BY A LIGHT BEAM

BACKGROUND OF THE INVENTION

1. Field of the Invention

The present invention generally relates to an optical recording/reproducing apparatus and, more particularly, to an optical recording and reproducing apparatus, an optical recording apparatus and an optical reproducing apparatus for optically recording/reproducing data on/from an optical recording medium such as an optical disk or an optical card having a recording area comprising a plurality of tracks.

As used herein, the term optical recording/reproducing apparatus includes each of an optical recording and reproducing apparatus, an optical recording apparatus and the optical reproducing apparatus.

2. Description of the Related Art

Conventional track access techniques for moving a light beam from a current track to a target track in an optical recording/reproducing apparatus include a coarse access method in which the entire optical head is moved to position the light beam to the target track, and a fine access method in which an objective lens is driven by an objective lens tracking driving unit, instead of driving the optical head, to move the light beam to an adjacent track.

Normally, when the target track is separated from the track where the light beam is presently positioned by a predetermined value (10 to 50 tracks) or more, coarse access is performed. When the distance is smaller than the predetermined value, fine access is performed. In this manner, efficient access is realized.

A conventional method of performing an up and down count operation of the number of crossed tracks when such track access operations are performed is disclosed in U.S. Pat. No. 4,484,319.

In this method, a photodetector is divided into two parts along a direction parallel to the tracks. Using a track error signal obtained from a difference signal between outputs from the photodetector parts, a sum signal of the divided photodetector parts, and a reproduction signal, the phase of the track error signal is compared with that of the sum signal at a non-data portion. At a recording portion, the phase of the track error signal is compared with that of the reproduction signal. In accordance with the order of phase shift, an up and down count operation is performed.

That is, in this method, the phase of the track error signal is compared with that of the OR of the sum signal and the reproduction signal. The direction of the light beam crossing the tracks and the number of crossed tracks are obtained in accordance with the order of phase shift.

In the coarse access method for a conventional optical recording/reproducing apparatus, tracking servo is turned off first. While performing the up and down count operation by the above-described method, the optical head is moved to the target track. Upon detecting on the basis of the count value of the up and down count operation that the light beam reaches the target track, tracking servo is turned on.

Fine access is normally performed using track jump processing in which the objective lens is accelerated by the objective lens tracking driving unit for a predetermined time, and thereafter, decelerated, thereby moving the light beam to the adjacent track within a very short time.

Track jump processing of a conventional optical recording/reproducing apparatus is disclosed in U.S. Pat. No. 4,539,664.

FIG. 23 is a flow chart showing track jump processing of the conventional optical recording/reproducing apparatus.

In step S1, tracking servo is turned off. In step S2, an acceleration signal (predetermined constant) is set at the objective lens tracking driving unit to drive the objective lens tracking driving unit, thereby starting to move the objective lens to the target track and accelerating the light beam to come close to the target track.

After an elapse of a predetermined time in step S3, a deceleration signal (predetermined constant) is set in step S4, thereby decelerating the light beam to be stopped near the target track. Note that, as a deceleration signal, an acceleration signal having the opposite sign is normally used.

When a predetermined time has elapsed in step S5, and the light beam is positioned near the target track, tracking servo is turned on in step S6. In step S7, processing waits for a predetermined time until the servo system is stabilized, thereby ending jump processing.

FIG. 21 is a chart showing the relationship between the waveform of a tracking driving signal (signal for driving the objective lens tracking driving unit) and that of a track error signal. In this case, the light beam is accurately moved to an adjacent track.

In the up and down count method as disclosed in U.S. Pat. No. 4,484,319, the phase of the tracking signal is compared with that of the OR of the sum signal and the reproduction signal, thereby performing the up and down count operation of the number of tracks. In this method, however, when the light beam is decelerated to almost stop in a track and finely drifts in the track, the up and down count operation is erroneously performed.

FIGS. 19A to 19G are charts showing the waveforms of various signals and the position of a light beam which drifts in a track in the prior art. FIG. 19A shows a state wherein the light beam is gradually moved close to a target track T while the up and down count operation of the number of crossed tracks is performed (in this case, the light beam is moved outside of the data recording area, i.e., where no data pit is present).

In this case, to compare the phase of a track error signal with that of a reproduction signal, a track error signal shown in FIG. 19B is compared with a predetermined threshold value TH1 and binarized, thereby obtaining a pulse signal TE2 shown in FIG. 19D. At the same time, a reproduction signal shown in FIG. 19C is compared with a predetermined threshold value TH2 and binarized, thereby obtaining a pulse signal RD shown in FIG. 19E.

When the phases continuously shift in the order of TE2=1 and RD=1, an up pulse signal UP shown in FIG. 19F is output. Inversely, when the phases continuously shift in the order of RD=1 and TE2=1, a down pulse signal DOWN shown in FIG. 19G is output.

As is apparent from FIGS. 19A to 19G, since the light beam drifts in a track, phases continuously shift in the order of RD=1 and TE2=1. For this reason, the down pulse signal DOWN is erroneously output.

As described above, in the conventional up and down count method, when the light beam drifts during movement to the target track, the up and down count operation cannot be properly performed.

In the conventional coarse access, after the up and down count operation of the number of crossed tracks is performed, and it is detected that the optical head reaches the target track, tracking servo is turned off. In this case, if the apparatus vibrates in accordance with movement of the optical head, and the light beam is positioned at a portion apart from the central portion of the target track (e.g., at the intermediate position to an adjacent track), the light beam is positioned not at the target track but at the adjacent track by turning off tracking servo.

In the conventional fine access method as disclosed in U.S. Pat. No. 4,539,664, if the value of an acceleration or deceleration pulse serving as a tracking driving signal input to an objective lens tracking driving unit 32 is inappropriate, tracking servo is turned off at a track other than the target track, so that the light beam is positioned not at the target track but at the different track.

FIG. 22 is a chart showing the waveforms of a tracking driving signal and a track error signal in the prior art, which are observed when the light beam is excessively moved and positioned not at the target track but at a different track.

This problem is posed when the value of an acceleration or deceleration signal is inappropriate, or when the width of an acceleration or deceleration pulse is inappropriate. A possible cause for this is that the driving sensitivity of the objective lens tracking driving unit changes due to the temperature or a variation caused in manufacturing processes.

SUMMARY OF THE INVENTION

It is, therefore, an object of the present invention to provide a new and improved optical recording/reproducing apparatus in which a stable and accurate up and down count operation of the number of tracks can be performed.

It is another object of the present invention to provide an optical recording/reproducing apparatus which a light beam is properly positioned to a target track.

According to an aspect of the present invention, there is provided an optical recording/reproducing apparatus, comprising: a photodetector for detecting a response light beam of a light beam irradiated on an optical recording medium having a plurality of tracks on which data is recorded and a plurality of guide tracks for separating the plurality of tracks; a count control signal generation circuit for performing predetermined calculation of an output from the photodetector, thereby generating three binary count control signals having different phases each other so that a position of the light beam on the tracks and the guide tracks along a direction of the light beam crossing the tracks is reflected; and count means for counting the number of tracks crossed by the light beam on the basis of the three count control signals generated by the count control signal generation circuit while recognizing a moving direction of the light beam.

According to another aspect of the present invention, there is provided an optical recording/reproducing apparatus, comprising: an optical head including a photodetector for radiating a light beam on an optical recording medium having a plurality of tracks on which data is recorded and a plurality of guide tracks for separating the plurality of tracks, and detecting a response light beam from the optical recording medium; a track error signal generation circuit for generating a track error signal from an output from the photodetector; light beam moving means for moving the light beam irradiated by the optical head along a direction for crossing the tracks on the optical recording medium; a tracking control unit for driving the light beam moving means on the basis of the track error signal from the track error signal generation circuit, thereby performing tracking control so that the light beam is positioned to a target track; and track error signal extension means for, when it is determined in accordance with the output from the photodetector that the light beam is positioned in an area other than the target track, extending the track error signal to obtain signals having values close to maximum and minimum values corresponding to bipolar peaks of the track error signal, and outputting the signal as the extended track error signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a view showing the arrangement of an optical head portion of an optical recording/reproducing apparatus according to the first embodiment of the present invention;

FIG. 4 is a view showing the arrangement of a photodetector used in the first embodiment of the present invention;

FIG. 5 is a partial enlarged view showing a recording/reproducing state of the optical card in FIG. 1;

FIGS. 7A and 7B are diagrams showing state transition so as to explain the operation of a count pulse generation circuit used in the first embodiment;

FIG. 8 is a chart showing the waveforms of various signals according to the first embodiment of the present invention;

FIGS. 9A to 9G are charts showing the waveforms of the various signals according to the first embodiment of the present invention;

FIG. 10 is a view showing the arrangement of a photodetector used in the second embodiment of the present invention;

FIG. 11 is a block diagram showing the arrangement of a signal processing unit used in the second embodiment of the present invention;

FIG. 13 is a block diagram showing the arrangement of a signal processing unit used in the third embodiment of the present invention;

FIGS. 17A and 17B are charts showing the waveforms of various signals, which are observed when track jump processing according to the fourth embodiment of the present invention is executed;

FIG. 18 is a flow chart showing the procedures of track jump processing according to the fourth embodiment of the present invention;

FIGS. 19A to 19G are charts showing the waveforms of various signals in up and down count processing of tracks in a prior art;

FIGS. 20A to 20F are charts showing the waveforms of various signals in up and down count processing of tracks in the present invention;

DETAILED DESCRIPTION OF THE PREFERRED EMBODIMENTS

Figure 1:
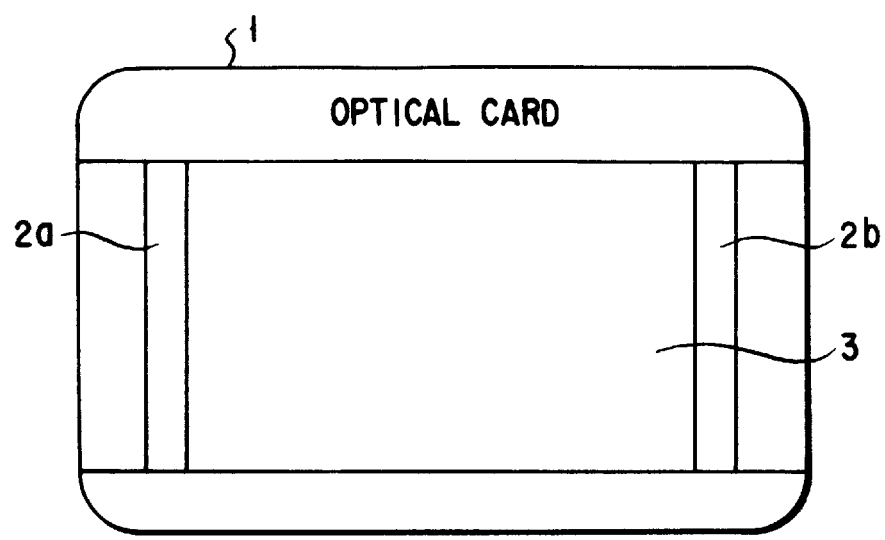
FIG. 1 is a view showing an optical card applied to the present invention.

Reference will now be made in detail to the presently preferred embodiments of the invention as illustrated in the accompanying drawings, in which like reference characters designate like or corresponding parts throughout the several drawings.

(First Embodiment)

The first embodiment of the present invention will be described below with reference to the accompanying drawings.

In the first embodiment to be described below, an optical recording/reproducing apparatus is applied as an optical card apparatus which records/reproduces information by using an optical card as a recording medium.

As shown in FIG. 1, an optical card 1 comprises a data recording portion 3 consisting of a plurality of tracks, and identification (ID) portions 2a and 2b arranged at two end portions of the data recording portion 3 and recording the address data of tracks.

Generally, such an optical card has a memory capacity several to ten thousand times that of a magnetic card, and the memory capacity is as large as 1 to 2 MBytes. For this reason, a variety of applications as a bankbook, a portable map, a prepaid card used for shopping, or the like can be considered.

The arrangement of the first embodiment will be described below.

Figure 2:
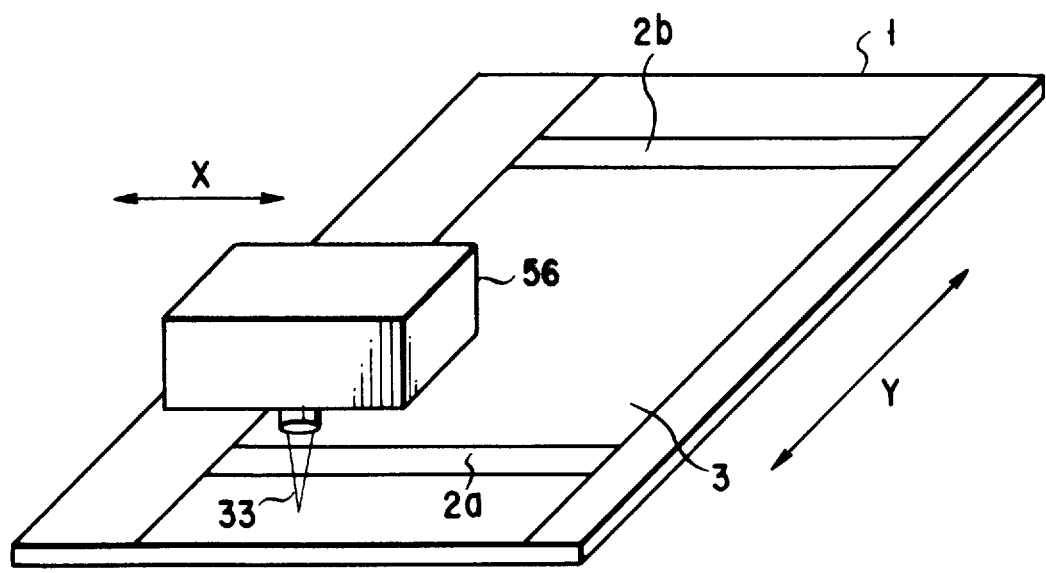
FIG. 2 is a perspective view showing a relative movement between an optical head applied to the present invention and the optical card.

FIGS. 2 and 3 show the arrangements of the optical recording/reproducing apparatus and an optical head portion.

The relative operation of an optical head 56 and the optical card 1 in the optical recording/reproducing apparatus of the first embodiment (an optical card is used as a recording medium) will be described below with reference to FIG. 2.

The optical head 56 is driven by a driving means (not shown) and moved along a direction indicated by an arrow X to access an arbitrary target track. The optical card 1 is driven by a driving means (not shown) and moved along a direction indicated by an arrow Y to record or reproduce data.

FIG. 3 is a view showing an arrangement of the optical head 56.

The optical head 56 is constituted by a light-emitting element 22, a collimator lens 23, a diffraction grating 24, an objective lens 25, a mirror 26, a mirror 27, a detection system lens 28, a mirror 29, a photodetector 30, an objective lens focusing driving unit 31, and an objective lens tracking driving unit 32.

A light beam emitted from the light-emitting element 22 is collimated by the collimator lens 23 and divided into three light beams by the diffraction grating 24. The three light beams are transmitted through the objective lens 25 and focused on the optical card 1.

The light beams irradiated on the optical card 1 are reflected by the optical card 1, reflected by the mirrors 26 and 27, transmitted through the detection system lens 28, reflected by the mirror 29, and incident on the photodetector 30.

An output from the photodetector 30 is supplied to a signal processing unit 60 to be described later.

The objective lens focusing driving unit 31 and the objective lens tracking driving unit 32 drive the objective lens to perform the tracking and focusing operations.

In this case, the optical card 1 is used as a recording medium. However, the same arrangement can be applied when another optical recording medium having a plurality of tracks, e.g., an optical disk having concentric or spiral tracks is used.

FIG. 4 is a view showing the photodetector 30 according to the first embodiment, viewed along the optical axis.

This embodiment uses three light beams. Therefore, the photodetector 30 comprises a photodetector 39 for detecting a reproduction signal and a focus error signal, and photodetectors 40 and 41 for detecting a track error signal.

The photodetector 39 is divided into photodetectors 39a and 39b along tracks to detect a focus error signal.

Light beams 33 to 35 reflected by the optical card 1 are respectively focused on the photodetectors 39a and 39b, 40, and 41, as shown in FIG. 4.

FIG. 5 is an enlarged view of the light beams 33 to 35 focused on the optical card 1.

The optical card 1 comprises a plurality of recording tracks 36, a plurality of guide tracks 37 for separating the plurality of recording tracks 36, and data pits 38 formed on the recording tracks 36. When tracking is performed to move the light beam 33 to the center of the track 36, halves of the side beams 34 and 35 overlap the guide tracks 37 on both the sides of the given track 36.

Figure 6:
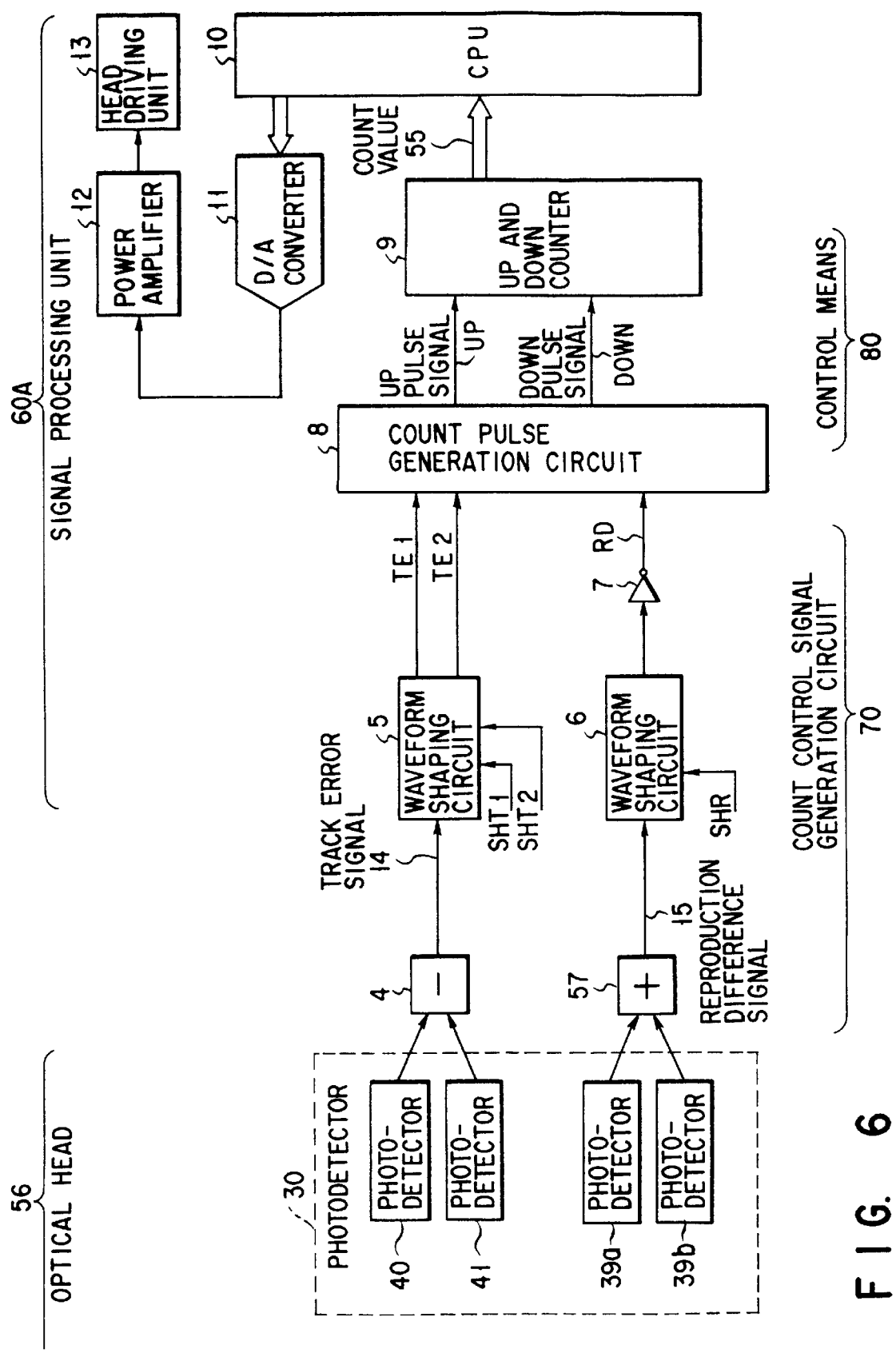
FIG. 6 is a block diagram showing the arrangement of a signal processing unit used in the first embodiment of the present invention.
Figure 12:
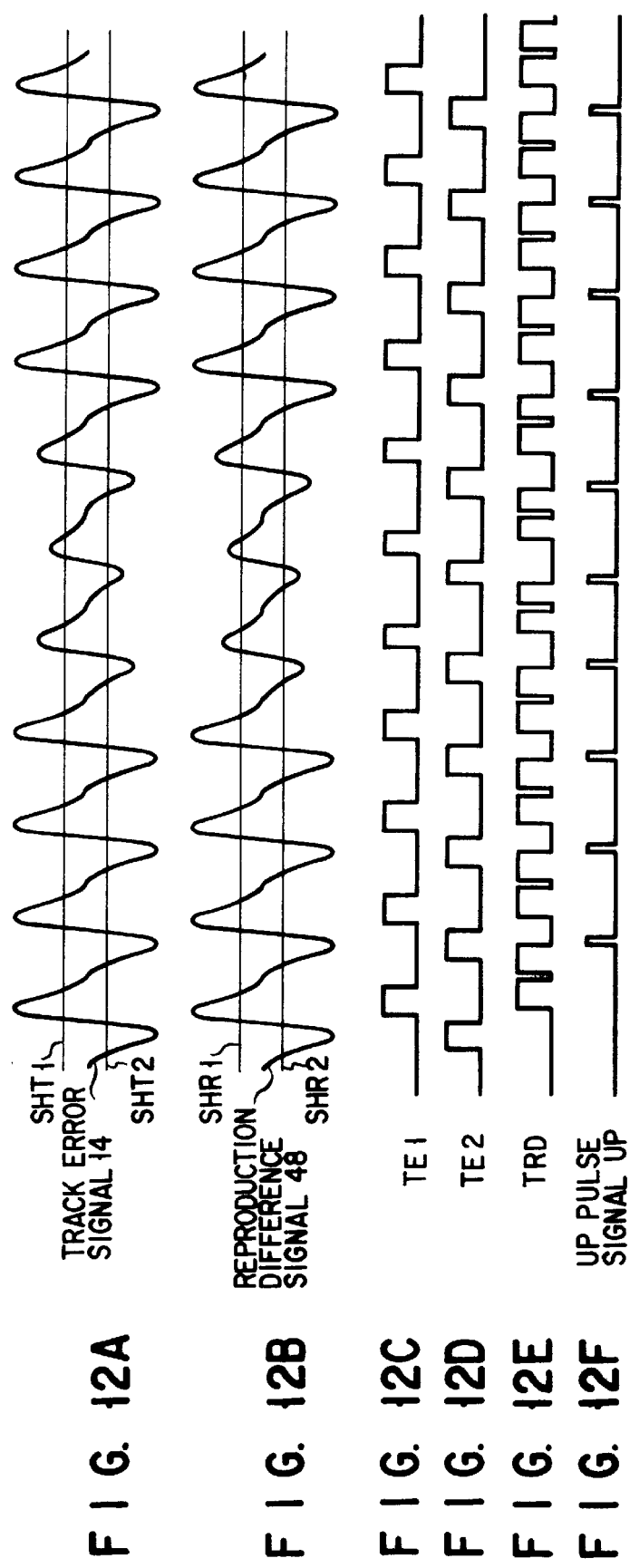
FIGS. 12A to 12F are charts showing the waveforms of various signals according to the second embodiment of the present invention.

FIG. 6 is a block diagram showing the arrangement of the signal processing unit 60 according to the first embodiment.

The signal processing unit 60 processes signals from the photodetector 30 in the optical head 56 and transmits a processed signal to a head driving unit 13 so as to drive the optical head 56.

As shown in FIG. 6, the signal processing unit 60 is constituted by a count control signal generation circuit 70 comprising a subtracter 4 connected to the photodetectors 40 and 41, a waveform shaping circuit 5 for shaping the waveform of an output from the subtracter 4, an adder 57 connected to the photodetectors 39a and 39b (FIG. 4), a waveform shaping circuit 6 for shaping the waveform of an output from the adder 57, and an inverter 7 for logically inverting an output from the waveform shaping circuit 6; a count means 80 comprising a count pulse generation circuit 8 for processing outputs from the waveform shaping circuit 5 and the inverter 7, and an up and down counter 9 for counting an output from the count pulse generation circuit 8; and a central processing unit (CPU) 10, a digital/analog (D/A) converter 11, and a power amplifier 12, which are sequentially connected. A driving signal is output from the power amplifier 12 to the head driving unit 13.

A function of the optical recording/reproducing apparatus according to the first embodiment with the above arrangement will be described below.

In FIG. 2, the light beam 33 on the optical card 1 along the X direction is moved outside of the ID portions 2a and 2b, i.e., where no data pit 38 (FIG. 5) is present.

Therefore, movement of the light beam 33 is not influenced by the data pits 38.

The subtracter 4 in FIG. 6 calculates the difference between outputs from the photodetectors 40 and 41 in FIG. 4 to generate a track error signal 14.

The track error signal 14 is compared with predetermined threshold values SHT1 and SHT2 by the waveform shaping circuit 5 and binarized. From the waveform of the track error signal 14, a first pulse signal TE1 corresponding to a portion with a value larger than the threshold value SHT1 and a second pulse signal TE2 corresponding to a portion with a value smaller than the threshold value SHT2 are output from the waveform shaping circuit 5 and input to the count pulse generation circuit 8.

The track error signal 14 oscillates between the maximum and minimum values when the light beam 33 is shifted from the center of the track (the data pit 38) by an amount corresponding to ½ the side beams 34 and 35.

When the track error signal 14 is binarized in accordance with two different threshold values, the first and second pulse signals TE1 and TE2 having different phases and reflecting the position of the light beam 33 on the track 36 or guide track 37 can be obtained.

The adder 57 calculates the sum of outputs from the photodetectors 39a and 39b to generate a reproduction signal 15.

The reproduction signal 15 is compared with a predetermined threshold value SHR by the waveform shaping circuit 6 and binarized. From the waveform of the reproduction signal 15, a third pulse signal corresponding to a portion with a value larger than the threshold value SHR is output from the waveform shaping circuit 6. The output from the waveform shaping circuit 6 is logically inverted by the inverter 7 and input to the count pulse generation circuit 8 as a pulse signal RD.

The reproduction signal 15 oscillates up to the maximum value when the light beam 33 is positioned at the center of the track 36.

When the reproduction signal 15 is binarized in accordance with a predetermined threshold value, the third pulse signal RD having a phase different from those of the two pulse signals TE1 and TE2 obtained from the track error signal 14 and reflecting the position of the light beam can be obtained.

Signal processing of the count pulse generation circuit 8 will be described later in detail. The count pulse generation circuit 8 uses the first to third pulse signals TE1, TE2, and RD to output an up pulse signal UP or a down pulse signal DOWN in accordance with the direction of the light beam crossing the tracks.

The up pulse signal UP or the down pulse signal DOWN is input to the up and down counter 9 so that a count value 55 increases or decreases. By clearing the count value 55 to zero when the light beam starts to move, the present moving distance of the light beam can be represented together with a sign.

The CPU 10 can calculate the present position of the light beam from the count value 55, and additionally, the present moving speed by measuring the time of position change.

On the basis of the moving position and moving speed of the light beam, the CPU 10 controls an output to the D/A converter 11, thereby controlling the driving force of the head driving unit 13 driven by the power amplifier 12. With this processing, the speed and position of the light beam are performed, so that the light beam can be moved to the target track.

Signal processing of the count pulse generation circuit 8 will be described below with reference to FIGS. 7A, 7B, and 8.

FIGS. 7A and 7B are diagrams showing state transition observed when the count pulse generation circuit 8 is constituted by a state machine. FIG. 8 is a chart showing the waveforms of the track error signal 14, the reproduction signal 15, the first to third pulse signals TE1, TE2, and RD, and the up pulse signal UP, which are observed when the light beam moves along the X direction while crossing the tracks.

FIG. 7A shows a state transition diagram for generation of the up pulse signal UP. FIG. 7B shows a state transition diagram for generation of the down pulse signal DOWN.

The state transition diagrams independently correspond to the state changes of the first to third pulse signals TE1, TE2, and RD, and the up pulse signal UP or the down pulse signal DOWN is generated.

The transition diagram for generation of the up pulse signal UP in FIG. 7A will be described. There are four states S0 to S3. In the states S0 to S2, the up pulse signal UP=0 is output. Only in the state S3, the up pulse signal UP=1 is output.

Conditions for state transition are as follows. When TE1=1, TE2=0, and RD=0, S0→S1. When TE1=0, TE2=0, and RD=1, S2→S2. When TE1=0, TE2=1, and RD=0, S2 S3. When TE1=0, TE2=1, and RD=0, S1→S0. When TE1=1, TE2=0, and RD=0, S2→S1. After the up pulse signal UP=1 is output in the state S3, the state unconditionally transits to S0.

An example of signal processing for generating the up pulse signal UP will be described below with reference to FIG. 8. Starting from the state S0, a condition such as TE1=1, TE2=0, and RD=0 is established at a boundary L2 in FIG. 8, so that the state transits to S1.

At a boundary L3, a condition such as TE1=0, TE2=0, and RD=1 is established, so that the state transits to S2. Subsequently, at a boundary L4, a condition such as TE1=0, TE2=1, and RD=0 is set, so that the state transits to S3. The up pulse signal UP=1 is output, and the state returns to S0.

The transition diagram for generation of the down pulse signal DOWN in FIG. 7B will be described. There are four states S4 to S7. In the states S4 to S6, the down pulse signal DOWN=0 is output. Only in the state S7, the down pulse signal DOWN=1 is output.

Conditions for state transition are as follows. When TE1=0, TE2=1, and RD=0, S4→S5. When TE1=0, TE2=0, and RD=1, S5→S6. When TE1=1, TE2=0, and RD=0, S6→S7. When TE1=1, TE2=0, and RD=0, S5→S4. When TE1=0, TE2=1, and RD=0, S6→S5. After the down pulse signal DOWN =1 is output in the state S7, the state unconditionally transits to S4.

The operation of the count pulse generation circuit 8 will be summarized below. When the input signal changes in the order of TE1=1, RD=1, and TE2=1, the up pulse signal UP=1 is output. Inversely, when the input signal changes in the order of TE2=1, RD=1, and TE1=1, the down pulse signal DOWN=1 is output.

FIGS. 9A to 9G are charts showing the states of the various signals of the optical recording/reproducing apparatus of this embodiment, which are observed when the position of the light beam changes as in FIGS. 19A to 19G showing the prior art.

In FIGS. 19A to 19G showing the prior art, when the light beam finely drifts in a track, the down pulse signal DOWN=1 is erroneously output. However, in FIGS. 9A to 9G showing this embodiment, only when the input signal changes in the order of TE2=1, RD=1, and TE1=1, the down pulse signal DOWN=1 is output. Therefore, even when the light beam drifts in a track, the down pulse signal DOWN=1 is prevented from being erroneously output, so that the up and down count operation is accurately performed.

In this embodiment, when the threshold values SHT1, SHT2, and SHR are set at predetermined values, the present position of the light beam 33 can be defined in accordance with the combination of the first to third pulse signals TE1, TE2, and RD.

This will be described below in more detail. As shown in FIG. 5, when the light beam 33 crosses the guide track and moves from the current track to the adjacent right track, the present positions of the light beam 33 are classified into five states, i.e., in the current track, between the current track and the adjacent right guide track, in the right guide track, between the right guide track and the adjacent track, and in the adjacent track.

The first to third pulse signals TE1, TE2, and RD are binary pulse signals having different phases. Therefore, eight states can be defined by the three pulse signals.

When the three threshold values are set such that one of the three pulse signals changes during transition of the light beam 33 among the five states, the five states can be defined in accordance with combinations of the three pulse signals without any overlap.

With this processing, the count pulse generation circuit 8 can properly recognize the five states and output the up pulse signal UP or the down pulse signal DOWN.

According to this embodiment, independently of the movement of the light beam on the tracks, the number of crossed tracks can be accurately counted while recognizing the moving direction of the light beam. For this reason, the present track position can be detected, and the light beam can be accurately controlled and positioned in the track access operation.

Various changes and modifications can be made for each arrangement of this embodiment, as a matter of course, and another known detection method can be used as the track error detection method.

For example, this embodiment can also be applied to the track error detection method disclosed in U.S. Pat. No. 4,484,319 in which the photodetector is divided into two parts to obtain a track error signal from a difference signal.

In addition, the count pulse generation circuit 8 can have an arrangement other than the state machine. The transition path in FIGS. 7A and 7B can be realized using a DSP and software.

(Second Embodiment)

The second embodiment of the present invention will be described below with reference to the accompanying drawings.

FIGS. 20A to 20F are charts showing the waveforms of various signals, which are observed when a stain of, e.g., a fingerprint sticks to an optical card 1 to result in a decrease in amplitude of a reproduction signal 15. When the amplitude of the reproduction signal 15 decreases, the third pulse signal RD is omitted, so the up and down count operation cannot be properly performed.

Taking this problem into consideration, the second embodiment further improves the optical recording/reproducing apparatus of the first embodiment.

FIGS. 10 and 11 show the arrangement of the main part of the second embodiment. The same reference numerals as in the first embodiment denote the same parts in FIGS. 10 and 11, and a detailed description thereof will be omitted.

The second embodiment largely differs from the first embodiment in that the number of divisions of a photodetector 30A is increased, as shown in FIG. 10. The photodetector 30A is divided into four photodetectors 39c, 39d, 39e, and 39f.

FIG. 11 is a block diagram showing the arrangement of a signal processing unit 60A according to the second embodiment.

The signal processing unit 60A shown in FIG. 11 is constituted by a count control signal generation circuit 70A comprising a subtracter 4 connected to photodetectors 40 and 41, a waveform shaping circuit 5 for shaping the waveform of an output from the subtracter 4, an adder 42 connected to the photodetectors 39c and 39e, an adder 43 connected to the photodetectors 39d and 39f, a subtracter 44 for calculating the difference between outputs from the adders 42 and 43, a waveform shaping circuit 45 for shaping the waveform of an output from the subtracter 44, and an OR circuit 47 for calculating the OR of two outputs from the waveform shaping circuit 45; a count means 80A comprising a count pulse generation circuit 8 for processing signals input from the waveform shaping circuit 5 and the OR circuit 47, and an up and down counter 9 for counting an output from the count pulse generation circuit 8; and a CPU 10, a D/A converter 11, and a power amplifier 12, which are sequentially connected.

The function of the second embodiment will be described below.

A track error signal 14 is compared with predetermined threshold values SHT1 and SHT2 by the waveform shaping circuit 5 and binarized. First and second pulse signals TE1 and TE2 are input to the count pulse generation circuit 8.

The adder 42 calculates the sum of outputs from the photodetectors 39c and 39e. The adder 43 calculates the sum of outputs from the photodetectors 39d and 39f.

The subtracter 44 calculates the difference between outputs from the adders 42 and 43 to form a reproduction difference signal 48.

The reproduction difference signal 48 is compared with predetermined threshold values SHR1 and SHR2 by the waveform shaping circuit 45 to generate two binary pulse signals.

The OR circuit 47 calculates the OR of these two binary pulse signals to generate a third pulse signal TRD which is input to the count pulse generation circuit 8.

The operation of the count pulse generation circuit 8 will be described below with reference to FIGS. 12A to 12F.

FIGS. 12A to 12F are charts showing the waveforms of the track error signal 14, the reproduction difference signal 48, the first to third pulse signals TE1, TE2, and TRD, and an up pulse signal UP, which are observed when the light beam crosses the tracks.

The details of signal processing of the count pulse generation circuit 8 are the same as in the first embodiment shown in FIGS. 7A and 7B except that the third pulse signal RD is replaced with TRD. Signal processing is also the same as in the first embodiment, and a detailed description thereof will be omitted.

As in the first embodiment, when the input signal changes in the order of TE1=1, TRD=1, and TE2=1, the up pulse signal UP=1 is output. Inversely, when the input signal changes in the order of TE2=1, TRD=1, and TE1=1, a down pulse signal DOWN=1 is output.

As in the first embodiment, when the threshold values SHT1, SHT2, SHR1, and SHR2 are set at predetermined values, the present position of a light beam 33 can be defined in accordance with the combination of the first to third pulse signals TE1, TE2, and TRD. With this processing, the count pulse generation circuit 8 can properly recognize the five states and output the up pulse signal UP or the down pulse signal DOWN.

According to the second embodiment, the reproduction difference signal 48 is used in place of the reproduction signal 15 of the first embodiment. Even when the light beam reflected by the optical card 1 is attenuated, and the amplitude of the reproduction signal 15 decreases due to a stain of, e.g., a fingerprint sticking to the optical card 1, the third pulse signal TRD is not omitted unless it becomes smaller than the threshold values SHR1 and SHR2. Therefore, the up pulse signal UP is properly output without being omitted.

That is, even when the light beam crosses a portion on the optical card 1 where a stain of, e.g., a fingerprint sticks, the up and down count operation of the number of crossed tracks can be accurately performed, so that the light beam can accurately reach the target track in the track access operation.

(Third Embodiment)

The third embodiment of the present invention will be described below with reference to the accompanying drawings.

In this embodiment, after the up/down count operation is performed using the method described in the first or second embodiment to reach the target track, the light beam is accurately positioned at the target track.

More specifically, according to a tracking method of this embodiment, after an entire optical head 56 reaches the target track, an objective lens 25 is driven to focus the light beam on the center of the track.

The same reference numerals as in the first and second embodiments denote the same parts in the third embodiment, and a detailed description thereof will be omitted.

The arrangement of this embodiment will be described below with reference to FIG. 13.

FIG. 13 is a block diagram showing the arrangement of a signal processing unit 60B according to the third embodiment.

The signal processing unit 60B according to this embodiment is constituted by a subtracter 4 for calculating the difference between outputs from photodetectors 40 and 41, an analog/digital (A/D) converter 51, a DSP 50, a D/A converter 52, a power amplifier 53, an objective lens tracking driving unit 32, and a CPU 10 for controlling the digital signal processor (DSP) 50, which are sequentially connected. The signal processing unit 60B has the same arrangement as of the signal processing unit 60 (60A) of the first or second embodiment except for the illustrated portions.

The function of this embodiment will be described below with reference to FIGS. 13 to 16.

Figure 14:
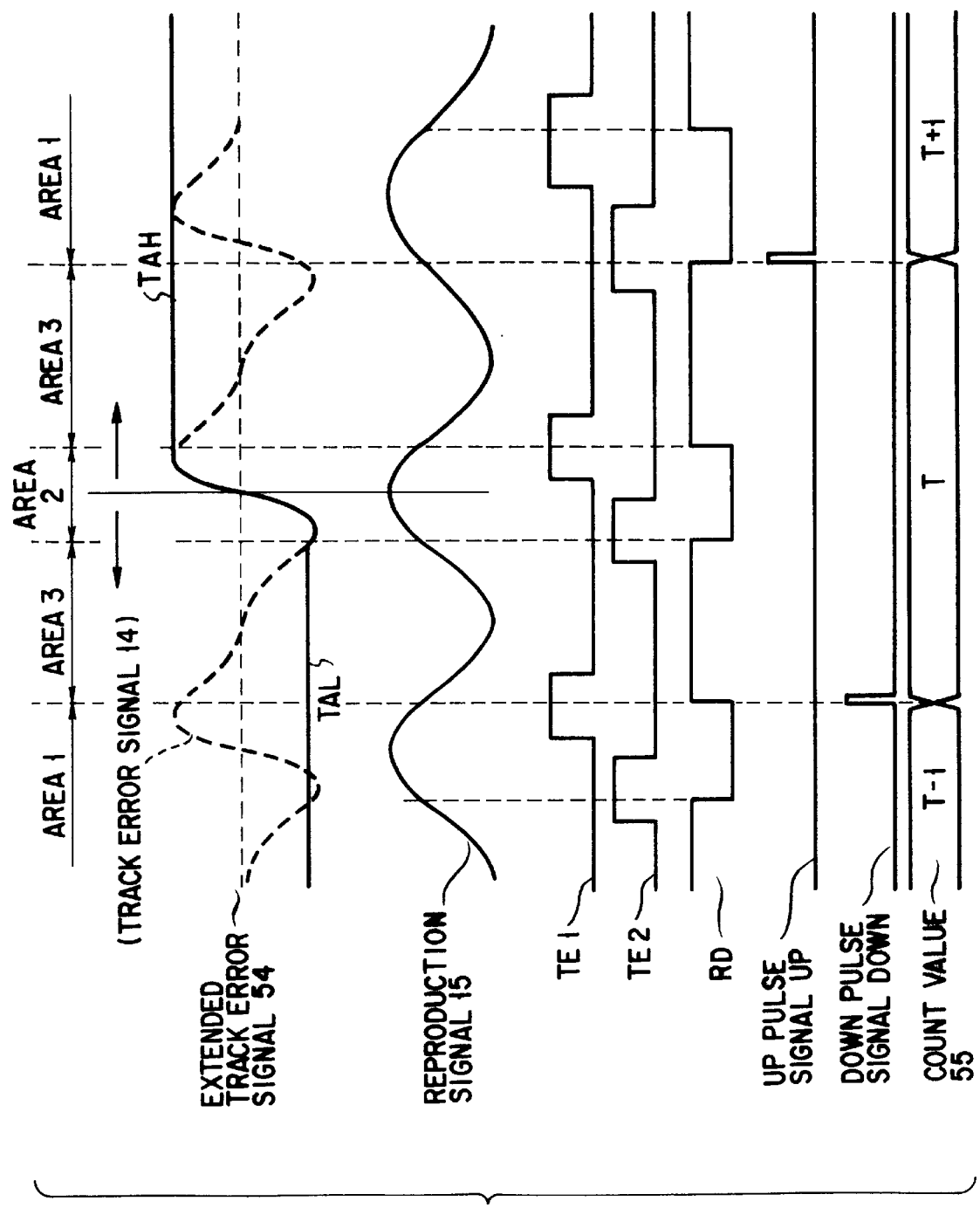
FIG. 14 is a chart showing the waveforms of various signals used in the third embodiment of the present invention.

FIG. 14 is a chart showing the waveforms of an extended track error signal 54 as a track error signal which is extended, a reproduction signal 15, first to third pulse signals TE1, TE2, and RD, an up pulse signal UP, and a down pulse signal DOWN, which are used to position the light beam to a target track T in this embodiment.

Referring to FIG. 14, a waveform indicated by a dotted line overlapping the extended track error signal 54 represents a signal TA60 (obtained by A/D-converting a track error signal 14) before extension is performed to form the extended track error signal 54.

Figure 15:
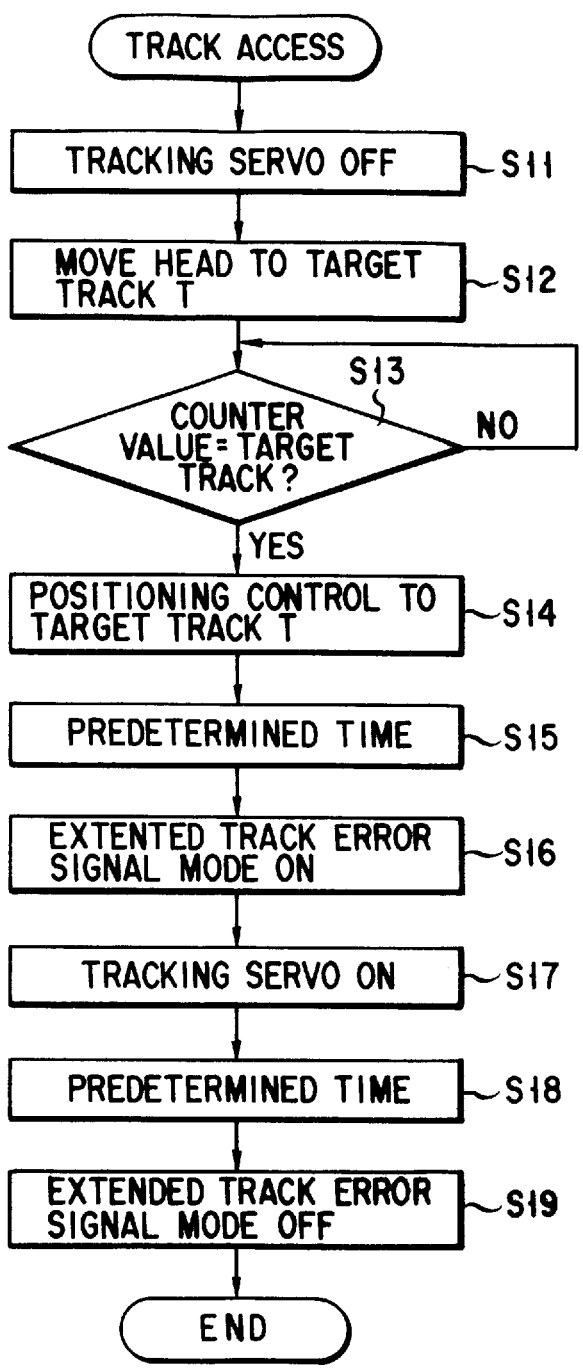
FIG. 15 is a flow chart showing the procedures of track access processing according to the third embodiment of the present invention.
Figure 16:
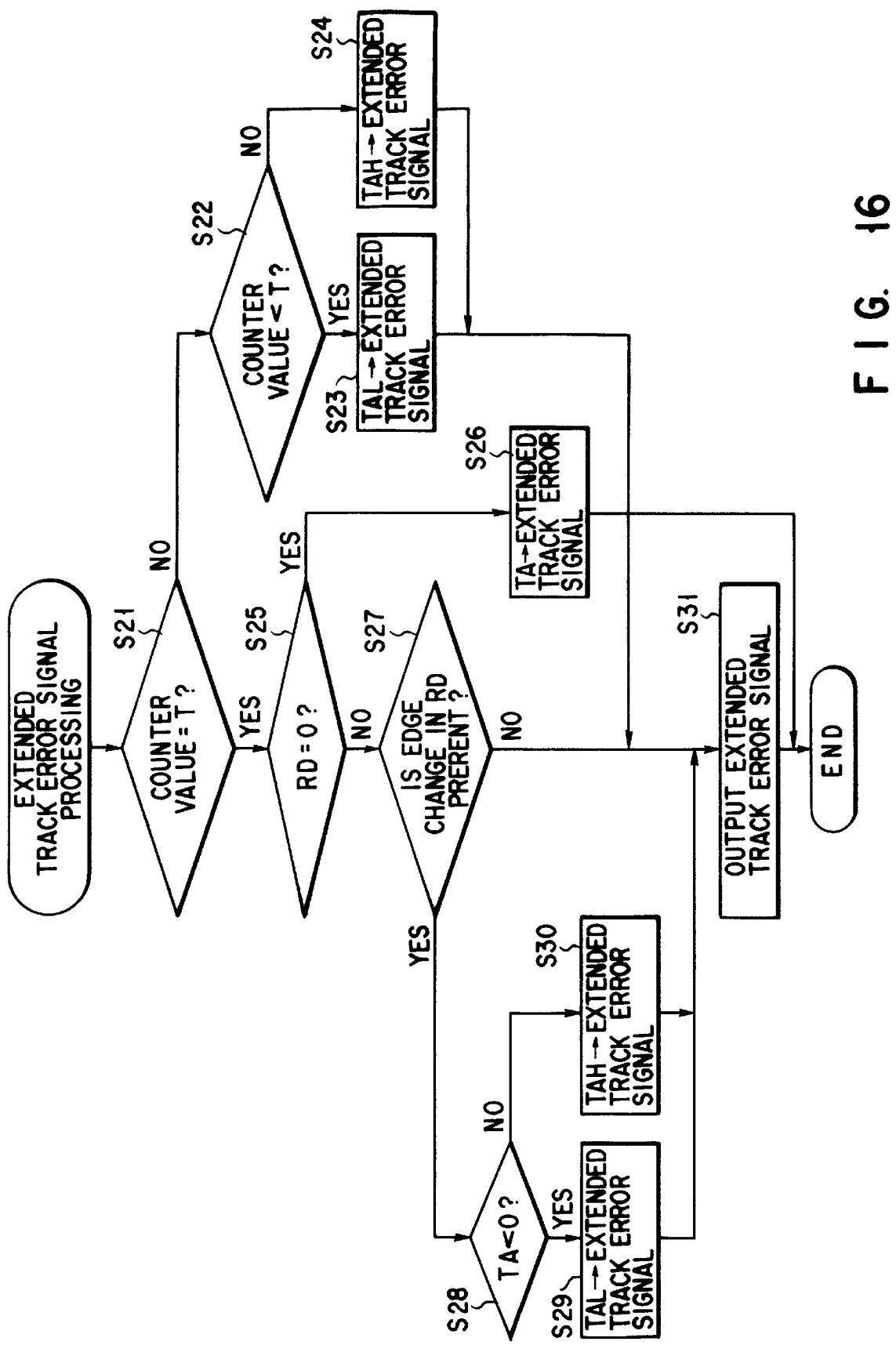
FIG. 16 is a flow chart showing the procedures of extended track error signal processing according to the third embodiment of the present invention.
Figure 21:
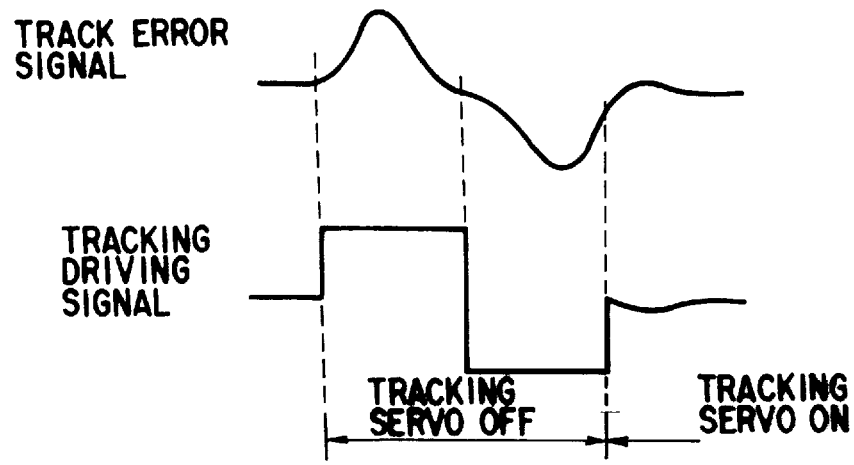
FIG. 21 is a chart showing the waveforms of various signals, which are observed when the conventional track jump processing is executed.
Figure 22:
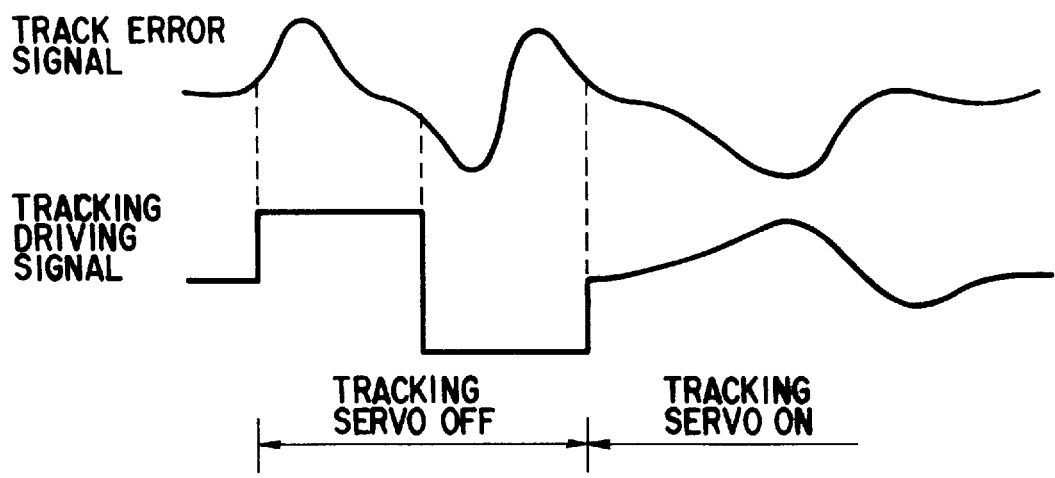
FIG. 22 is a chart showing the waveforms of various signals, which are observed when the conventional track jump processing is executed.

FIG. 15 is a flow chart of track access processing according to the third embodiment. FIG. 16 is a flow chart of processing in an extended track error signal mode according to the third embodiment.

The entire flow of track access processing will be described below.

As shown in FIG. 15, tracking servo is turned off in step S11. In step S12, the optical head 56 is moved to the target track T. At this time, the optical head 56 is moved to the target track T while the up and down count operation is performed by the method as shown in the first or second embodiment.

It is determined in step S13 whether a count value 55 reaches the target track T. If YES in step S13, the count value 55 is used to perform positioning control of the light beam at the target track T in step S14.

In step S15, processing waits for a predetermined time until positioning control is stabilized. In step S16, the extended track error signal mode is enabled to periodically execute extended track error signal processing shown in FIG. 16. In step S17, tracking servo is turned on.

In step S18, processing waits for a predetermined time until the extended track error signal mode is stabilized. Upon stabilization, the extended track error signal mode is disabled in step S19, thereby setting a normal tracking servo state.

The entire flow of signals in the signal processing unit 60B in the extended track error signal mode will be described below with reference to FIG. 13.

The subtracter 4 calculates the difference signal between outputs from the photodetectors 40 and 41. The difference signal is input to the A/D converter 51 as the track error signal 14.

The track error signal 14 is A/D-converted into the signal TA60 by the A/D converter 51 and input to the DSP 50.

The DSP 50 processes the signal TA60 in the extended track error signal on the basis of an instruction from the CPU 10 and outputs the extended track error signal 54 to the D/A converter 52.

The extended track error signal 54 is D/A-converted into a tracking driving signal 57 by the D/A converter 52. The tracking driving signal 57 is input to the objective lens tracking driving unit 32 through the power amplifier 53.

The objective lens tracking driving unit 32 drives the objective lens 25 on the basis of this signal, thereby performing tracking control.

Processing in the extended track error signal mode will be described below with reference to FIGS. 14 and 16.

Note that, as shown in FIG. 14, a threshold value TAH is close to one peak value of the track error signal 14, and a threshold value TAL is close to the other peak value of the track error signal 14.

In the extended track error signal mode, it is checked first in step S21 whether the count value 55 (FIG. 11) coincides with the target track T.

If NO in step S21 (if the light beam is positioned in area 1 in FIG. 14), it is checked in step S22 whether the count value 55 is larger than T.

More specifically, it is checked whether the light beam is positioned on the (T+1) side of the target track (on the right side of FIG. 14) or its (T−1) side (on the left side of FIG. 14).

If the count value 55 is smaller than T, i.e., if the light beam is positioned on the (−1) side, the extended track error signal 54 is formed in accordance with the threshold value TAL in step S23, as shown in FIG. 14.

If the count value 55 is larger than T, i.e., if the light beam is positioned on the (T+1) side, the extended track error signal 54 is formed in accordance with the threshold value TAH in step S24, as shown in FIG. 14. In either case, the flow advances to step S31 to output the extended track error signal 54, thereby ending the extended track error signal mode.

If YES in step S21, it is checked in step S25 whether RD=0.

If YES in step S25 (if the light beam is positioned in area 2 in FIG. 14), the light beam is positioned on the target track T. Therefore, in step S26, the signal TA60 is output as the extended track error signal 54, thereby ending the extended track error signal mode.

If RD=1 (if the light beam is positioned in area 3 in FIG. 14), it is checked in step S27 whether an edge change is present in the signal RD (extended track error signal processing is periodically performed in a short time, so that an edge change caused when the light beam positioned in area 2 in the previous processing moves to area 3 can be properly detected).

If NO in step S27, the light beam is previously positioned in area 3. Therefore, the flow advances to step S31 to output the previous extended track error signal 54 as the extended track error signal 54 of this time.

If YES in step S27, it is checked in step S28 whether the signal TA60 is positive or negative.

If the signal TA60 is negative, the extended track error signal 54 is formed in accordance with the constant TAL in step S29. If the signal TS60 is positive, the extended track error signal 54 is formed in accordance with the constant TAH in step S30.

In either case, the extended track error signal 54 is output in step S31, thereby ending the extended track error signal mode.

After the extended track error signal mode is ended, tracking servo is performed as shown in FIG. 15.

At this time, the extended track error signal 54 used for tracking servo has a zero point only at the center of the target track T and none at other positions.

When the extended track error signal 54 is used to perform tracking servo, the light beam at any position near the target track T can be finally positioned to the zero point of the target track T.

As described above, according to the third embodiment, even when the apparatus vibrates due to movement of the head in the track access operation, or even when the light beam for reproduction is positioned to a portion far from the central portion of the target track (e.g., at the intermediate position to an adjacent track), the light beam can be properly positioned at the target track without being positioned to a different track.

In this embodiment, tracking servo is constituted as digital servo. However, analog tracking servo can also be applied.

Extended track error signal processing is realized by a program using a DSP (e.g., a TMS320C30 available from Texas Instruments Inc.). However, extended track error signal processing can also be realized by hardware using circuits. In this embodiment, extended track error signal processing after the light beam reaches the target track T has been described. However, when extended track error signal processing as described above is performed during movement of the light beam, track positioning to the target track can be more accurately performed.

(Fourth Embodiment)

This embodiment improves track jump as a fine access technique.

The fourth embodiment of the present invention will be described below with reference to FIGS. 17A, 17B, and 18. FIGS. 17A and 17B are charts showing the waveforms of a track error signal 14 and a tracking driving signal 57, which are observed when track jump processing according to the fourth embodiment is executed. FIG. 18 is a flow chart of track jump processing according to the fourth embodiment.

The arrangement of the fourth embodiment is the same as that of the third embodiment except for a program executed by a DSP 50.

The function of this embodiment will be described below with reference to FIG. 18. In step S41, tracking servo is turned off. In step S42, a constant TDP (acceleration signal) is set to a variable TD (signal for driving an objective lens tracking driving unit 32) in the DSP 50 in accordance with a command from a CPU 10. In step S43, the signal TD is output to a D/A converter 52 so that the light beam is accelerated to come close to the target track.

In step S44, processing waits for a predetermined time while periodically performing extended track error signal processing which has been described in detail in the third embodiment. Thereafter, in step S45, a constant TDM (deceleration signal) is set in the variable TD. In step S46, the signal TD is output to the D/A converter 52 so that the moving light beam is decelerated to be positioned to the target track.

As the variable TDM, the variable TDP whose sign is changed is normally used.

In step S47, processing waits for a predetermined time while performing extended track error signal processing. Thereafter, in step S48, the extended track error signal is turned on, and subsequently, tracking servo is turned on. Processing waits for a predetermined time in step S50 until the servo system is stabilized, thereby ending processing.

FIGS. 17A and 17B show the waveforms of an extended track error signal 54 and the tracking driving signal 57 at this time.

Figure 23:
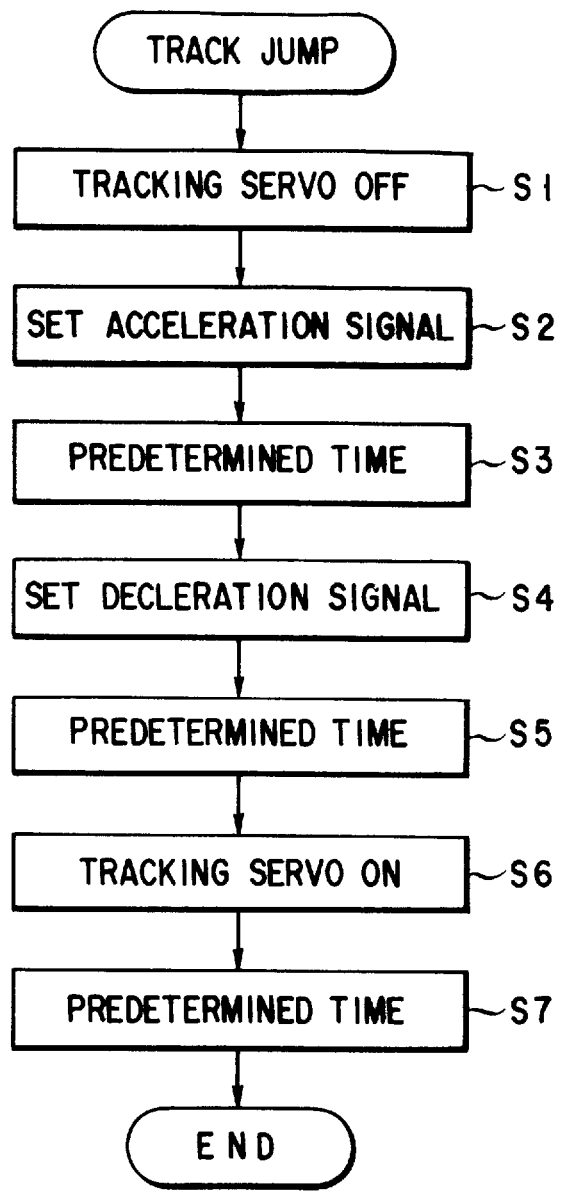
FIG. 23 is a flow chart showing the procedures of the conventional track jump processing.

As shown in FIG. 23, if the value of the acceleration or deceleration signal (TDP or TDM) is inappropriate, or if the acceleration or deceleration pulse width is inappropriate, the light beam is positioned not to the target track but to a different track in the conventional optical recording/reproducing apparatus.

In this embodiment, however, the extended track error signal is used as a track error signal. Therefore, tracking servo to the target track is properly executed.

According to this embodiment, even if the value of the signal TDP or TDM is inappropriate, or even if the acceleration or deceleration pulse width is inappropriate in track jump processing, the light beam can be properly positioned at the center of the target track.

In this embodiment, tracking servo is constituted as digital servo. However, analog tacking servo can also be used. Extended track error signal processing is realized by a program using a DSP. However, extended track error processing can also be realized by hardware using circuits.

In the first to fourth embodiments, the present invention is applied to an apparatus using an optical card as a recording medium. However, the present invention with the same arrangement and function of each of the above embodiment can also be applied to an optical recording/reproducing apparatus using another optical recording medium such as an optical disk having concentric or spiral tracks.

As has been described above in detail, in the optical recording/reproducing apparatus of the present invention, an accurate and stable track count operation can be executed in track access processing of the light recording medium, and additionally, the light beam can be properly positioned at the target track.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An optical recording/reproducing apparatus, comprising:
   a photodetector for detecting a response light beam of a light beam irradiated on an optical recording medium having a plurality of tracks on which data is recorded and a plurality of guide tracks arranged to separate said plurality of tracks;
   a count control signal generation circuit for performing a predetermined calculation of an output from said photodetector, thereby generating three binary count control signals having different phases with respect to each other so that a position of the light beam on said tracks and said guide tracks along a direction of the light beam crossing said tracks is reflected; and
   a count unit for counting a number of tracks crossed by the light beam based on the three count control signals generated by said count control signal generation circuit while recognizing a moving direction of the light beams;
   wherein said count unit comprises:
      a count pulse generation circuit for generating a count pulse based on a positioning transition path of the light beam which transits in accordance with the three count control signals; and
      a track count circuit for counting count pulses output from said count pulse generation circuit.

2. An apparatus according to claim 1, wherein said count unit further comprises a digital signal processor (DSP).

3. An apparatus according to claim 1,
   further comprising a track error signal generation circuit for generating a track error signal from the output from said photodetector, and
   wherein said count control signal generation circuit binarizes the track error signal in accordance with different threshold values, thereby generating first and second count control signals of the three count control signals.

4. An apparatus according to claim 3,
   further comprising a reproduction signal generation circuit for generating a reproduction signal from the output from said photodetector, and
   wherein said count control signal generation circuit binarizes the reproduction signal in accordance with a predetermined threshold value, thereby generating a third count control signal of the three count control signals.

5. An apparatus according to claim 4, wherein said count pulse generation circuit generates a first count pulse when the count control signal generation circuit sequentially generates the first count control signal, the third count control signal, and the second count control signal, and
   wherein said count pulse generation circuit generates a second count pulse when the count control signal generation circuit sequentially generates the second count control signal, the third count control signal, and the first count control signal.

6. An apparatus according to claim 3, wherein
   said photodetector has at least two photodetectors divided along a direction crossing said tracks, said photodetectors generating reproduction signals,
   said apparatus further comprises a reproduction difference signal generation circuit for generating a reproduction signal from a difference between outputs from said photodetectors, and
   said count control signal generation circuit sets two different threshold values with respect to the reproduction difference signal from said reproduction difference signal generation circuit, and binarizes the reproduction difference signal inside and outside an area sandwiched between the two threshold values, thereby generating a third count control signal of the three count control signals.

* * * * *